United States Patent [19]

Schweitz et al.

[11] Patent Number: 4,915,203

[45] Date of Patent: Apr. 10, 1990

[54] TRANSMISSION CONTROL FOR SELF-PROPELLED IMPLEMENT

[75] Inventors: Kenneth D. Schweitz, Oconomowoc; James T. Dowe, Beaver Dam, both of Wis.

[73] Assignee: Deere & Company, Moline, Ill.

[21] Appl. No.: 310,190

[22] Filed: Feb. 10, 1989

[51] Int. Cl.⁴ .............................................. F16D 21/08
[52] U.S. Cl. .................................. 192/48.5; 192/48.7; 56/11.8; 474/114; 474/116
[58] Field of Search ................... 192/48.7, 48.5, 48.3, 192/49, 3.51; 56/11.6, 11.7, 11.8; 74/396; 474/101, 113, 116, 117, 114, 115; 180/231

[56] References Cited

U.S. PATENT DOCUMENTS

| 2,722,281 | 11/1955 | Falkenberg | 56/11.8 |
| 4,212,141 | 7/1980 | Miyazawa et al. | 56/11.8 |
| 4,214,641 | 7/1980 | Hauser | 56/11.8 |
| 4,689,939 | 9/1987 | Seyerle | 56/11.8 |

FOREIGN PATENT DOCUMENTS 44-24002  10/1969  Japan ...................................... 192/49

OTHER PUBLICATIONS

"21-Inch Rotary Walk Behind Mower (1989)", John Deere Horicon Works, PC-2264, p. 40-12, 16 Dec. 1988.

"21-Inch, 2 Cycle Rotary Walk Behind Mower", John Deere Horicon Works, PC-2096, pp. 20-13 to 20-17, 14 Apr. 1988.

*Primary Examiner*—Leslie A. Braun
*Assistant Examiner*—David A. Testardi

[57] ABSTRACT

A drive wheel control for a walk-behind self-propelled implement, such as a lawn mower. The control activates sequentially a transmission ball clutch and then a V-belt drive to provide positive and gradual drive wheel start up. Disengagement of the ball clutch allows the drive wheels to freewheel and permits the operator to easily move the mower backwardly as when trimming around hedges and bushes. The control includes a pair of links pivotally connected, with one link rigidly mounted to the transmission. Movement of a single control cable connected to one link initially activates the ball clutch and then causes rocking movement of the other link and the transmission to engage the V-belt drive.

8 Claims, 5 Drawing Sheets

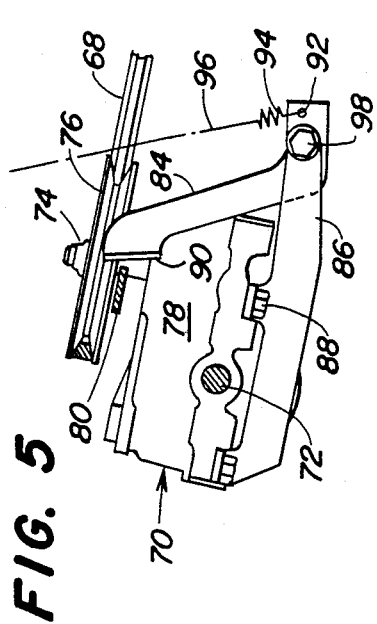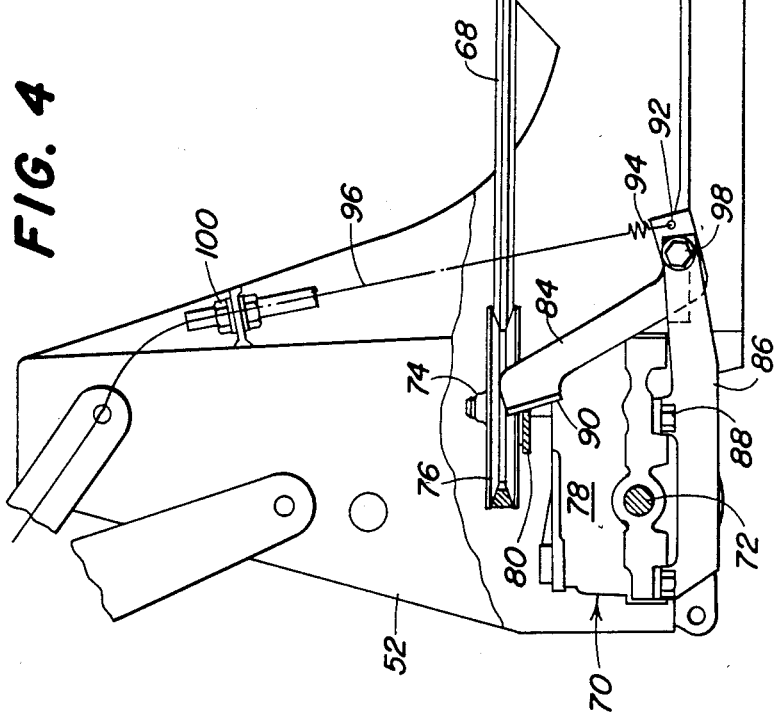

TRANSMISSION CONTROL FOR SELF-PROPELLED IMPLEMENT

FIELD OF THE INVENTION

This invention relates generally to self-propelled implements, such as walk-behind lawn mowers, and more particularly to a transmission control for drivingly engaging the rear wheels of a lawn mower with the engine drive shaft.

BACKGROUND OF THE INVENTION

It is common to equip walk-behind implements, such as lawn mowers, rotor tillers and lawn edgers, with wheels driven by an engine. In many such implements, the drive wheels are powered through a V-belt connection between the engine and a transmission.

One difficulty often encountered with such V-belt drive arrangements occurs when the operator is trimming around bushes, hedges and other areas where he occasionally will want to pull the implement back and then let it proceed ahead.

Many mowers and similar implements with V-belt drives have transmissions in which the axle, gears and driven V-belt sheave all rotate in reverse when the wheels are turned rearwardly. Since this condition exists even when the V-belt drive is disengaged, there will be considerable drag on the wheels as the driven V-belt sheave is rotated in reverse against the V-belt's resistance.

One attempt to overcome this problem is provided in a mower which utilizes a transmission equipped with a ball clutch and means for clutching and unclutching the V-belt drive. The ball clutch couples the input pulley shaft to the drive wheel axle, making it possible for the operator to de-couple the axle from the transmission before the machine is moved rearwardly, thereby permitting the axle to freewheel and eliminating back drive of the transmission elements.

Such a control mechanism is illustrated in this Application in FIGS. 2 and 3. FIG. 2 illustrates this mechanism in its disengaged position and FIG. 3 illustrates it in its engaged position. To drivingly power the V-belt 10, a belt tightener arrangement is interposed between the engine or drive pulley 12 and the transmission 14 and its driven pulley 16. The tightener includes a set of sheaves or set of pulleys 18 and 20 around which the V-belt 10 is trained. The pulleys 18 and 20 are mounted on an idler bracket 22 carried on a pivot structure 24 mounted on the mower housing 26. The transmission 14, a Kanzaki Tuff Torq, is equipped with a separate lever 28 for engaging and disengaging its ball clutch. A shifter rod 30, taking the form of an elongated wire, is connected between the belt tightener idler bracket 22 and the ball clutch lever 28 so that movement of the rod 30 by the operator simultaneously activates the ball clutch and tightens the V-belt 10 around the drive and driven pulleys 12 and 16.

This arrangement provides for simultaneous activation of the ball clutch and a V-belt clutch. Occasionally, however, the V-belt clutch may become fully engaged prior to engagement of the ball clutch causing the drive wheels to not be engaged as smoothly as desired.

An additional problem with this control mechanism arises when adjustment of the shifter rod in the idler bracket is required due to belt wear. As the V-belt wears, the belt tightener bracket has to be rotated about its pivot point through a greater arc to tighten the belts. Since the new arc swung by the adjusted idler bracket is increased as this adjustment is made and the arc through which the ball clutch lever is moved does not need to be increased, the length of the shifter rod must be adjusted. To permit this adjustment, slots are provided in the idler bracket. If the operator did not make this adjustment as belt wear occurred, the shifter rod would deflect or bend as the operator tried to engage the V-belt drive.

Since multiple parts are required with this control mechanism, manufacturing and repair costs are incurred that would be higher than those costs associated with a fewer number of parts.

SUMMARY OF THE INVENTION

To overcome these problems, a new control structure for a transmission having a ball clutch and belt pulley drive is provided which positively engages the ball clutch prior to engagement of the V-belt drive.

This structure permits the operator to activate a single control handle and simultaneously, but sequentially, engage the ball clutch and then the V-belt clutch. Correspondingly, when disengaging the rear wheel drive, the V-belt clutch is first disengaged and then the ball clutch is disengaged.

With this control, the operator can disengage the ball clutch, temporarily disengaging the rear wheels, allowing them to freewheel, while he trims around bushes and hedges. As he then re-engages the drive, the ball clutch will engage first, then the V-belt clutch will engage, providing positive gradual start-up of the drive wheels.

The control mechanism includes a linkage arrangement wherein one link is pivotally carried on another link which in turn is rigidly carried on the transmission. As the operator pulls the control handle, the one link pivots about its connection with the other link to activate the ball clutch. After the ball clutch is engaged, further movement of the one link rotates the other link and the transmission about the wheel axle to move the transmission sheave away from the drive sheave and tighten the V-belt. As belt wear occurs, the control cable can be quickly shortened to rock the transmission through a greater arc and, therefore, tighten the belt.

The present control mechanism requires only two links, a spring and control cable, thereby resulting in reduced manufacturing and repair costs.

BRIEF DESCRIPTION OF THE DRAWINGS

FIG. 4 illustrates an enlarged partial view of the control linkage with the ball clutch and belt clutch engaged.

FIG. 5 illustrates an enlarged partial view of the control linkage in its disengaged position.

DESCRIPTION OF THE PREFERRED EMBODMIENTS

Figure 1:
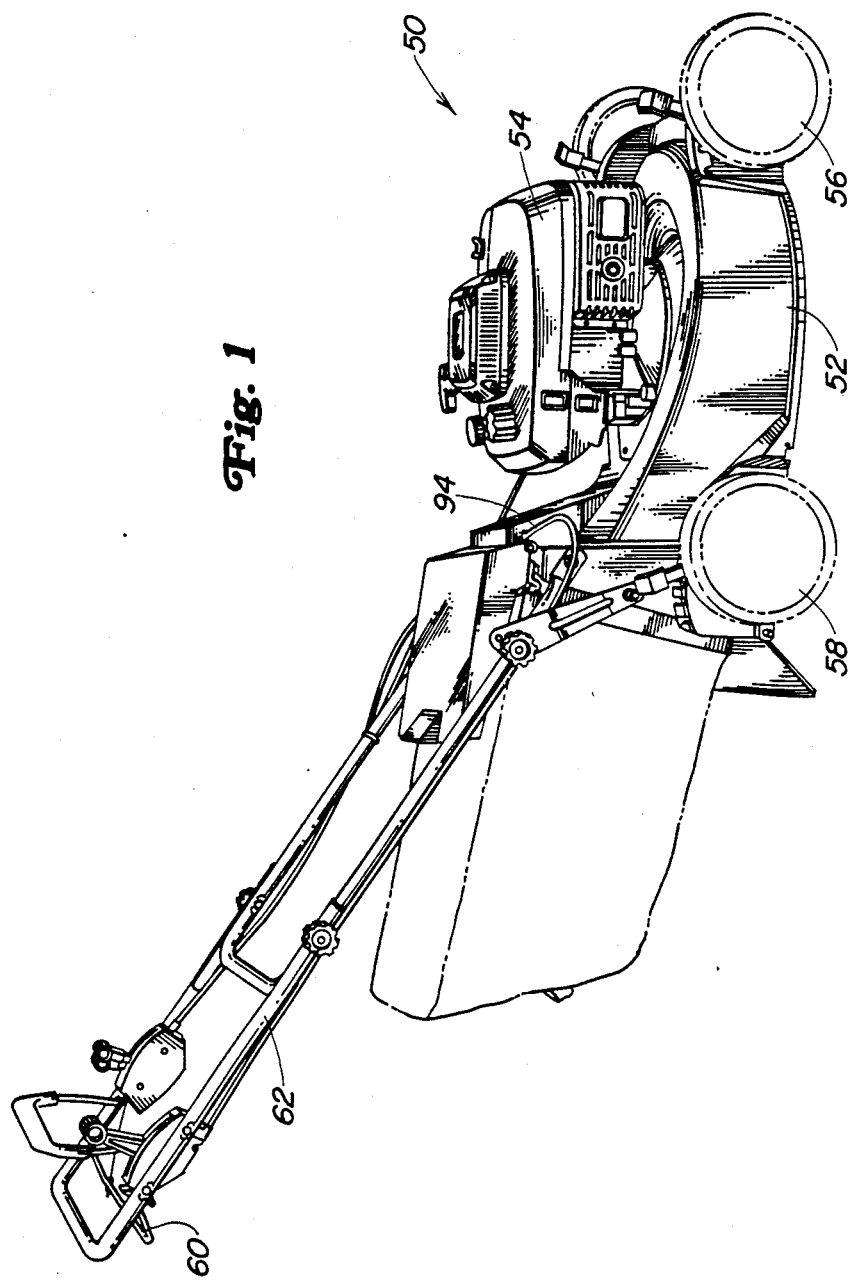
FIG. 1 illustrates a walk-behind rotary lawn mower of the type upon which the transmission and control mechanism of the present invention can be utilized.
Figure 2:
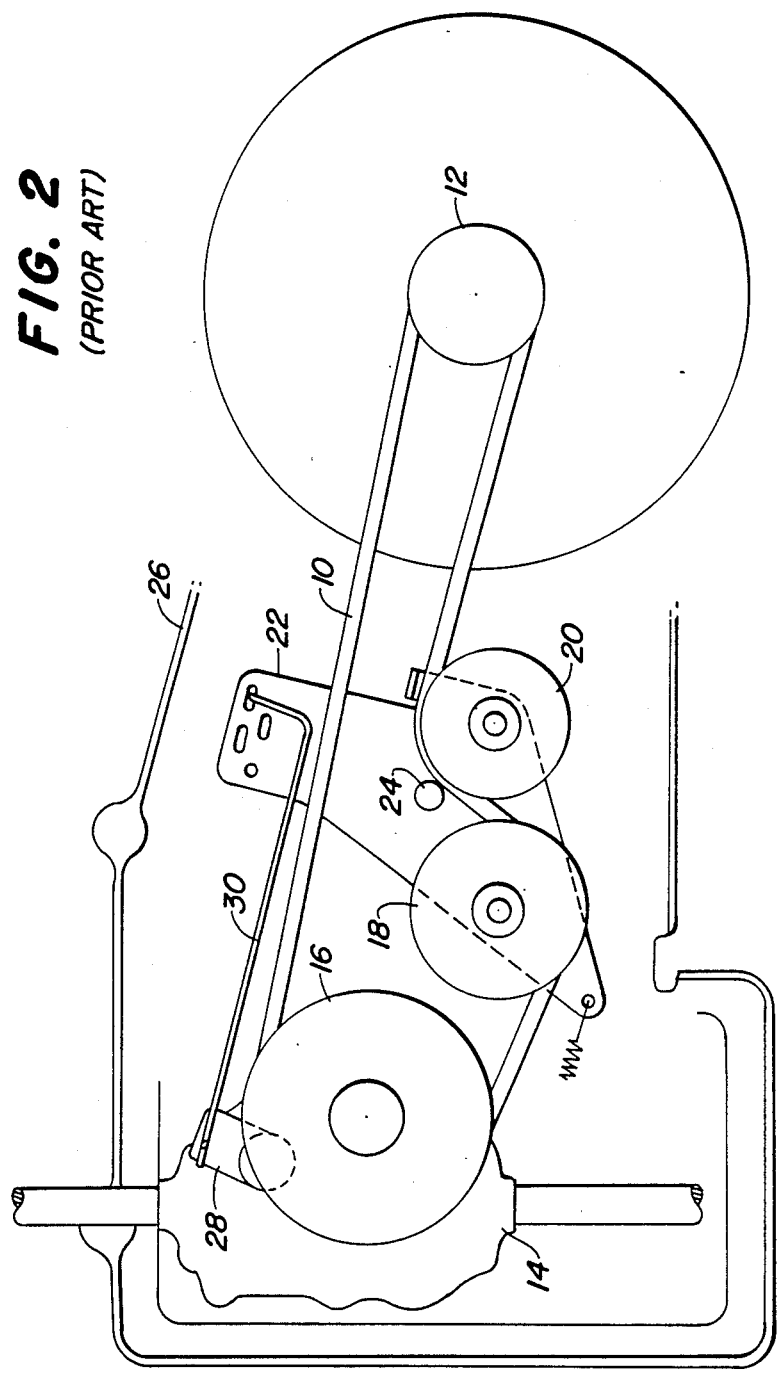
FIG. 2 illustrates a prior art control linkage, the belt clutch and ball clutch being shown in their disengaged positions.
Figure 3:
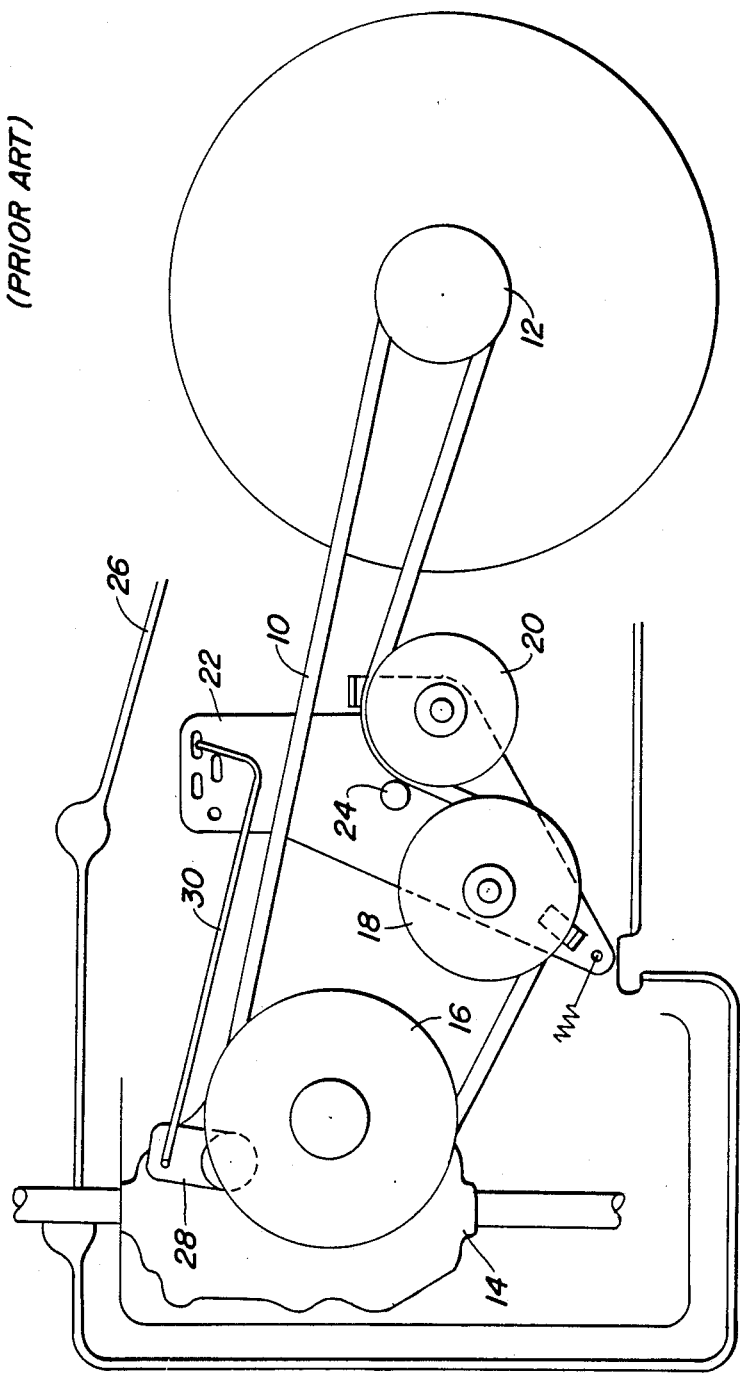
FIG. 3 illustrates the prior art structure of FIG. 2 with the belt clutch and ball clutch in their engaged positions.

Looking now to FIG. 1, there is illustrated a walk-behind lawn mower 50 of the type which could be used with the present invention. The mower 50 is equipped with a housing 52 which carries an engine 54 and ground-engaging wheels 56 and 58, the rear wheels 58 being engagably controlled by the bale or clutch lever 60 mounted at the upper end of the handle 62.

As illustrated in FIGS. 4 and 5, the engine 54 carries a downwardly projecting shaft 64 which has mounted on it a drive pulley 66 around which is entrained a V-belt 68. For driving the wheels 58 at selected speeds, there is provided a transmission 70 having its axle 72 carried by the housing 52. The transmission 70 has projecting upwardly from it an input drive shaft 74 which in turn carries a driven pulley 76 that has the V-belt 68 also entrained around it. The transmission 70 is further equipped with a clutch for engaging the axle with the transmission gearing. That clutch, in the preferred embodiment is a ball clutch but other mechanical clutches, such as dog clutches or friction clutches, all of which are well known in the art, could be used. The transmission case is designated 78 while the lever for activating the ball clutch is designated 80. The mechanical clutch is schematically illustrated by the spring which urges the ball clutch lever 80 towards its disengaged position is designated 82. Such transmissions are commercially available and one transmission which will work with the present invention is produced by Kanzaki under the Model No. X-394 Transaxle.

The control mechanism of the present invention is comprised of structure for sequentially engaging the ball clutch lever 80 and then the belt 68 where the operator desires to have the rear wheels 58 powered. When the operator wants to disengage the drive wheels 58, the control mechanism first disengages the V-belt 68 and then disengages the ball clutch 80.

Figure 6:
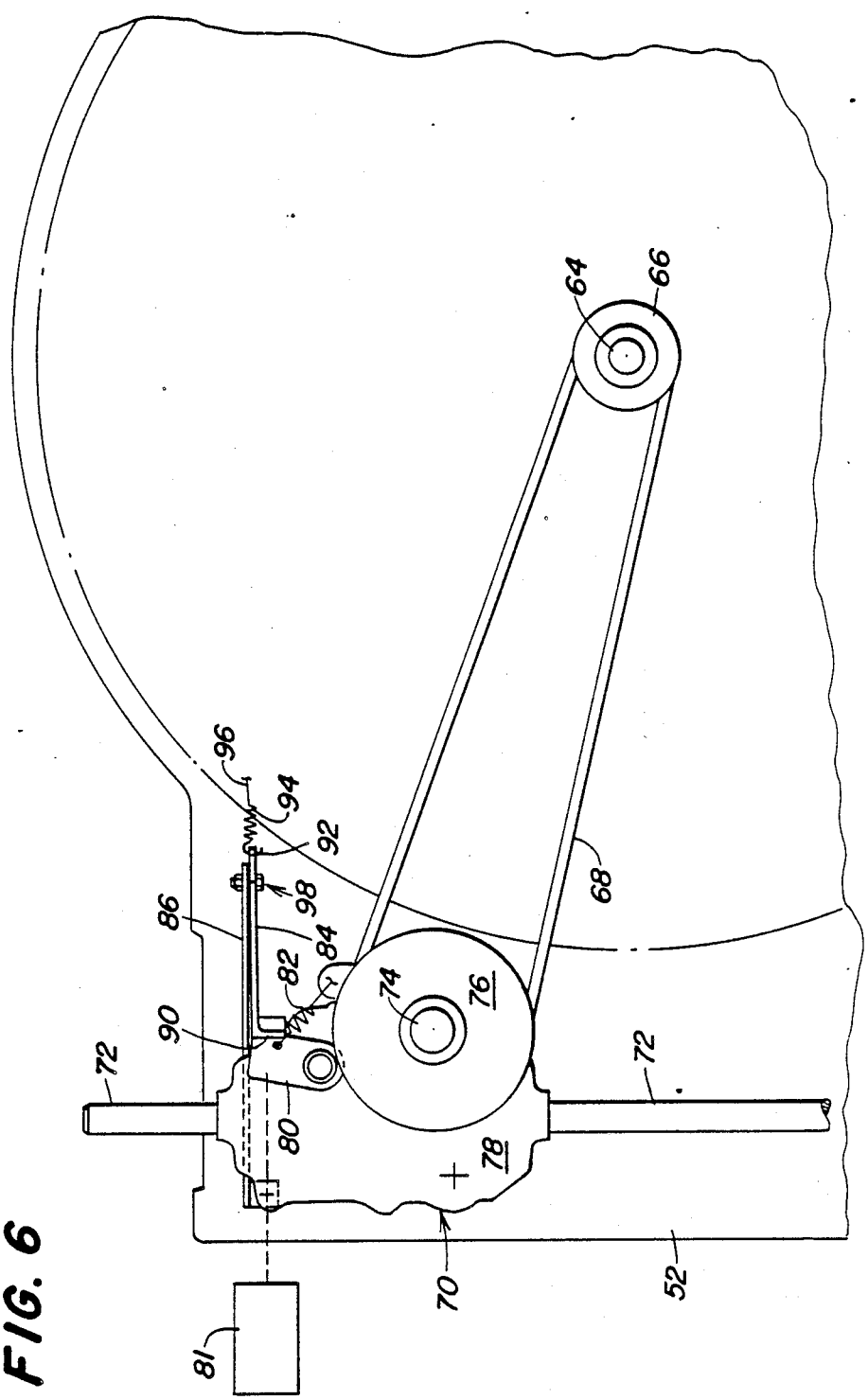
FIG. 6 illustrates a plan view taken along lines 6—6 of FIG. 4.

The structure for accomplishing this control includes two links 84 and 86, the second link 84 being attached to the end of the first link 86. FIGS. 4, 5 and 6 best illustrate these linkages 84 and 86. The second link 84 takes the general form of an L and is pivotally carried on one end of the first link 86. The first link 86 in turn is rigidly mounted by bolts 88 or similar means to the transmission casing 78. At one end of the second link 84 is provided a stop or abutment surface 90 which engages the ball clutch lever 80. Carried in an opening 92 provided in the end of the second link 84 is a spring 94 which is connected to the clutch cable 96 and urges the second link 84 counterclockwise about its connection with the first link 86. The cable 96, in turn, is routed conventionally to the control or bale 60 carried at the upper end of the handle 62.

FIG. 5 illustrates the orientation assumed by the transmission 70 and control linkages 84 and 86 when declutched. In this position, the ball clutch lever 80 is urged towards its disengaged position by spring 82. The transmission 70 is rocked about its axle mounting moving the driven pulley 76 forwardly and towards the drive pulley 66, providing slack in the V-belt 68, and thereby disengaging the drive for the belt 68. Since the greater portion of the transmission mass is forward of the axle 72, it will be rocked clockwise when the control cable 96 is released. If the engine is running and the belt 68 being driven when the bale 60 is released, the axle torque will further assist in rocking the transmission 70 forwardly.

When the operator wants to operate the mower 50, using the drive wheels 58, he pulls on the bale 60 carried on the handle 62, which in turn retracts the clutch cable 96 to rock the second link 84 about its pivotal connection 98 with the first link 86 and, therefore, engage the ball clutch through movement of the ball clutch lever 80. Once the ball clutch has been engaged, the second link 84 can no longer rotate about its pivotal connection 98 with the first link 86. Further movement of the second link 84 then causes the first link 86 to be pulled counterclockwise as viewed in FIG. 4 about the axle connection with the housing to rock the transmission 70 counterclockwise to the position illustrated in FIG. 4. This movement of the transmission 70 in turn separates the driven pulley 76 from the drive pulley 66 and tightens the V-belt 68, providing power to the input shaft 74 in the transmission 70 and driving the wheels 58.

When the operator is mowing around hedges, trees and other close quarters and desires to pull the mower 50 backwardly, he simply releases the bale 60 to disengage the V-belt drive and ball clutch. Disengagement of the ball clutch permits the axle 72 to freewheel within the transmission 70, thereby eliminating the back drag that would occur if the axle 72 were not disengaged from the transmission gears during the backing maneuver.

With the present invention, positive and sequential engagement of the ball clutch and V-belt clutch is provided with a minimum number of parts. Simple adjustment of the clutch cable 96 is provided through the adjusting nuts 100 and mounting to account for V-belt wear that would normally occur.

We claim:

1. For use in a walk-behind self-propelled implement having a housing with a powered drive shaft and sheave;
    a transmission rockably supported by the housing, the transmission having
        an axle,
        an input shaft and sheave, and
        clutch means operatively interposed between the input shaft and the axle;
    at least one ground-engaging drive wheel operatively coupled to the transmission axle;
    flexible drive means operatively coupling the drive shaft sheave with the transmission sheave; and
    an improved drive wheel control comprising:
        a first link means carried by the transmission;
        a second link means for selectively actuating the clutch means and carried for movement with the first link means, the second link means being swingable between a first position where it first causes the clutch means to be engaged and the first link means and transmission to rock about a support and lengthen the distance between the two sheaves and a second position where it causes the clutch means to become disengaged and the transmission to rock about the support to shorten the distance between the two sheaves; and
    means connected with the second link for moving it between its first and second position.

2. The invention defined in claim 1 wherein the clutch means is a mechanical clutch operatively effective to permit the axle to freewheel when the clutch means is in its disengaged position.

3. The invention defined in claim 1 wherein there is additionally provided biasing means urging the second link towards its first position.

4. The invention defined in claim 1 wherein the second link means is generally L-shaped, is pivotally connected to the first link means and carries an abutment surface which is engagable with the clutch means.

5. The invention defined in claim 1 wherein the first link means is rigidly attached to the transmission for rocking movement therewith.

6. The invention defined in claim 1 wherein the means coupled to the second link for moving it between its first and second position is adjustable.

7. For use in a walk-behind self-propelled implement having a housing with a powered drive shaft and sheave;

a transmission rockably carried by the housing and having an axle, an input shaft and sheave and clutch means between the input shaft and axle, moveable between first and second positions where it is respectively effective to drivingly couple or uncouple the transmission sheave and axle;

at least one ground-engaging drive wheel operatively coupled to the transmission axle, flexible drive means operatively coupling the drive shaft sheave with the transmission sheave; and an improved drive wheel control comprising:

a first link carried by the transmission and pivotable between first and second positions, the first link being effective in its first position to move the clutch means to its first position, and the first link being effective in its second position to move the clutch means to its second position; and means connecting the first link to the transmission so that as the first link moves the clutch means to its first position, further movement of the first link means in the same direction causes the transmission to rock about its mounting and thereby increase the distance between the two sheaves.

8. The invention defined in claim 7 wherein the clutch means is a mechanical clutch.

* * * * *